(12) United States Patent
Ma et al.

(10) Patent No.: US 12,531,798 B2
(45) Date of Patent: Jan. 20, 2026

(54) NETWORK INSPECTION METHOD, NETWORK DEVICE, AND NETWORK MANAGEMENT DEVICE

(71) Applicant: Huawei Technologies Co., Ltd., Shenzhen (CN)

(72) Inventors: Xiaoping Ma, Shenzhen (CN); Xiaopeng Qin, Shenzhen (CN); Qiufang Ma, Nanjing (CN); Qin Wu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 40 days.

(21) Appl. No.: 18/749,890

(22) Filed: Jun. 21, 2024

(65) Prior Publication Data

US 2024/0348522 A1   Oct. 17, 2024

Related U.S. Application Data

(63) Continuation of application No. PCT/CN2022/129482, filed on Nov. 3, 2022.

(30) Foreign Application Priority Data

Dec. 21, 2021 (CN) .......................... 202111573878.0
May 7, 2022 (CN) .......................... 202210493235.3

(51) Int. Cl.
*H04L 43/0817* (2022.01)
*H04L 43/0823* (2022.01)

(52) U.S. Cl.
CPC ...... *H04L 43/0817* (2013.01); *H04L 43/0823* (2013.01)

(58) Field of Classification Search
CPC ............ H04L 43/0817; H04L 43/0823; H04L 41/0213; H04L 41/0894; H04L 43/02; H04L 43/04; H04L 63/20; H04L 43/08
See application file for complete search history.

(56) References Cited

U.S. PATENT DOCUMENTS

| | | | |
|---|---|---|---|
| 2008/0034082 A1* | 2/2008 | McKinney | .......... G06F 11/3466 709/224 |
| 2018/0084012 A1* | 3/2018 | Joseph | .................... H04L 63/20 |
| 2018/0288063 A1* | 10/2018 | Koottayi | ................. G06F 21/50 |

FOREIGN PATENT DOCUMENTS

| | | |
|---|---|---|
| CN | 102347965 A | 2/2012 |
| CN | 108282355 A | 7/2018 |

(Continued)

OTHER PUBLICATIONS

Q. Wu et al., "A Yang Data model for ECA Policy Management," draft-ietf-netmod-eca-policy-01, Feb. 19, 2021, 44 pages.

*Primary Examiner* — Philip C Lee
(74) *Attorney, Agent, or Firm* — Conley Rose, P.C.

(57) ABSTRACT

A network inspection method comprising obtaining target inspection policy information, where the target inspection policy information indicates the network device to collect inspection result information, and the inspection result information includes first network data and second network data status information; obtaining the inspection result information in response to a case in which the network device meets an inspection trigger condition; sending an inspection report to the network management device for the network management device to determine a network inspection result based on the inspection report, where the inspection report includes the inspection result information.

20 Claims, 10 Drawing Sheets

(56) References Cited

FOREIGN PATENT DOCUMENTS

| | | | |
|---|---|---|---|
| CN | 111126631 A | 5/2020 | |
| CN | 112766891 A | 5/2021 | |
| EP | 3869841 A1 * | 8/2021 | ............. H04W 4/44 |

* cited by examiner

NETWORK INSPECTION METHOD, NETWORK DEVICE, AND NETWORK MANAGEMENT DEVICE

CROSS-REFERENCE TO RELATED APPLICATIONS

This application is a continuation of International Patent Application No. PCT/CN2022/129482, filed on Nov. 3, 2022, which claims priorities to Chinese Patent Application No. 202111573878.0, filed on Dec. 21, 2021 and Chinese Patent Application No. 202210493235.3, filed on May 7, 2022. All of the aforementioned patent applications are hereby incorporated by reference in their entireties.

TECHNICAL FIELD

Embodiments of this application relate to the signal processing field, and in particular, to a network inspection method, a network device, and a network management device.

BACKGROUND

To monitor a health degree status of a network system, detect a fault in the network system in a timely manner, and sense a status change of a network device in the network system in real time, a network management device needs to perform real-time monitoring and routine inspection on the network device, to ensure that the network system can run securely, stably, and reliably for long time.

In a current solution for obtaining a status of a network device, a user usually remotely logs in to the network device and inputs a command line, where the command line indicates the network device to collect specified network raw data, for example, network raw data such as device logs and alarm information of the network device. After collecting the raw data of the network device, a network management device performs analysis to determine a health degree status of the network device.

In an existing network system inspection method, a user needs to input command lines one by one to obtain network data of a plurality of network devices in the network system. When there are a large quantity of network devices, efficiency of collecting the network data by the network management device is low, and a large amount of data needs to be collected. This imposes great performance pressure on the network management device. In addition, the network management device collects data of the network device in this case, and validity of the collected network data is low.

SUMMARY

Embodiments of this application provide a network inspection method, a network device, and a network management device, to improve efficiency of performing inspection on the network device by the network management device, reduce an amount of collected data, and improve validity of collected network data.

A first aspect of embodiments of this application provides a network inspection method. The method include a network device obtains target inspection policy information, where the target inspection policy information indicates the network device to collect inspection result information, the inspection result information includes first network data and second network data status information, the first network data is network data indicated by a target inspection policy information to be reported, the second network data status information indicates whether second network data is abnormal, and the second network data is network data indicated by the target inspection policy information to be inspected; the network device obtains the inspection result information in response to a case in which the network device meets an inspection trigger condition; and the network device sends an inspection report to a network management device, so that the network management device determines a network inspection result based on the inspection report, where the inspection report includes the inspection result information.

In this possible implementation, the inspection report sent by the network device to the network management device includes inspection information, and the inspection information includes the first network data and the second network data status information. The network device may not send the second network data, namely, network raw data, to the network management device. This improves efficiency of obtaining information about the network device by the network management device. In addition, the network management device does not need to analyze and process a large amount of raw data. This reduces a task amount of the network management device, and reduces costs of the network management device.

In a possible implementation of the first aspect, that a network device obtains target inspection policy information includes the network device receives the target inspection policy information sent by the network management device; or the network device obtains the target inspection policy information from a built-in inspection policy information library.

In this possible implementation, the network device may not only receive the inspection policy information sent by the network management device, but also obtain the inspection policy information from the built-in inspection policy information library. This improves feasibility of this solution. In addition, the network device has the built-in inspection policy information library so that the network device can perform network inspection without interacting with the network management device. This reduces information interaction between the network management device and the network device and saves network resources.

In a possible implementation of the first aspect, that the network device meets the inspection trigger condition includes the network device determines that an event indicated by the target inspection policy information occurs; or the network device determines that a parameter indicated by the target inspection policy information meets a threshold condition; or the network device meets a time condition indicated by the target inspection policy information.

In this possible implementation, the trigger condition of the inspection policy information may be that an event occurs, a parameter meets a threshold, or a time condition is met. Diversity of the trigger conditions of the inspection policy information increases diversity of the solutions in embodiments of this application, and improves feasibility of this solution.

In a possible implementation of the first aspect, before the network device obtains the inspection result information, the method further includes the network device converts the target inspection policy information into executable information of the network device; and correspondingly, that the network device obtains the inspection result information includes the network device obtains the inspection result information by executing the executable information.

In a possible implementation of the first aspect, the executable information includes one or more of the following such as a script, a command, an internal object, or an interface.

In a possible implementation of the first aspect, that the network device obtains the inspection result information includes the network device obtains the first network data and the second network data; and the network device determines the second network data status information based on the second network data.

In this possible implementation, after obtaining the second network data, the network device does not send the raw second network data to the network management device, but determines the status information of the second network data through processing such as logical judgement, and then sends the second network data status information to the network management device. This reduces an amount of information in the inspection report sent by the network device to the network management device, reduces a waste of the network resources, and improves network inspection efficiency. In addition, the network device processes the second network data in advance to determine the status information. This reduces the task amount of the network management device, improves the network inspection efficiency, and further reduces the costs of the network management device.

In a possible implementation of the first aspect, the inspection result information further includes health degree information of the network device and/or fault snapshot information of abnormal second network data, where the abnormal second network data is second network data with an abnormal data status, and the fault snapshot information includes the second network data whose check result is abnormal, and context information, related configuration, and status data corresponding to the abnormal second network data.

In a possible implementation of the first aspect, the network device obtains the inspection result information further includes the network device determines a quantity of entries of the abnormal second network data; and the network device determines the health degree information of the network device based on the quantity of entries of the abnormal second network data, a quantity of entries of the second network data, and a weight of the abnormal second network data.

In a possible implementation of the first aspect, the inspection result information further includes an identifier of the target inspection policy information.

In a possible implementation of the first aspect, the method further includes the network device sends an inspection policy information obtaining request to the network management device, where the inspection policy information obtaining request indicates the network management device to send the target inspection policy information to the network device.

A second aspect of embodiments of this application provides a network inspection method. The method includes a network management device receives a first inspection report sent by a first network device, where the first inspection report includes first inspection result information collected by the corresponding first network device based on an indication of first inspection policy information, the first inspection policy information indicates the first network device to collect the first inspection result information, the first inspection result information includes first network data and second network data status information, the first network data is network data indicated by a target inspection policy information to be reported, the second network data status information indicates whether second network data is abnormal, and the second network data is network data indicated by the target inspection policy information to be inspected; and the network management device determines a network inspection result based on the first inspection report.

In this possible implementation, the inspection report received by the network management device does not include the raw second network data, but the status information of the second network data determined through processing such as logical judgement. This reduces an amount of information in the inspection report sent by a network device to the network management device, reduces a waste of network resources, and improves network inspection efficiency. In addition, the network device processes the second network data in advance to determine the status information. This reduces a task amount of the network management device, improves the network inspection efficiency, and further reduces costs of the network management device.

In a possible implementation of the second aspect, the method further includes the network management device generates the first inspection policy information based on an inspection policy set by a user; and the network management device sends the first inspection policy information to the first network device.

In this possible implementation, the user may not need to manually deliver command lines for obtaining the network data of the network device one by one, but select, from the inspection items provided by an inspection item management library, an inspection item that meets a user intention, generate inspection policy information, and send the inspection policy information to the network device. This improves the network inspection efficiency and reduces time for delivering a network inspection task.

In a possible implementation of the second aspect, that the network management device sends the first inspection policy information to the first network device includes the network management device sends the first inspection policy information to the first network device by using a network protocol, where the network protocol is one of a File Transfer Protocol (FTP), a Secure File Transfer Protocol (SFTP), a Network Configuration Protocol (NETCONF), and a Representational State Transfer Configuration Protocol (RESTCONF).

In a possible implementation of the second aspect, that the network management device determines the network inspection result based on the first inspection report includes the network management device determines the network inspection result based on the first inspection result information.

In a possible implementation of the second aspect, the network inspection result includes health degree information of an entire network system, and that the network management device determines the network inspection result based on the first inspection result information includes the network management device obtains health degree information of the first network device; and the network management device determines the health degree information of the entire network system based on the health degree information of the first network device and weight information corresponding to the first network device.

In a possible implementation of the second aspect, that the network management device obtains health degree information of the first network device includes the network management device determines health degree information of a corresponding network device based on a quantity of entries of abnormal second network data and a quantity of entries of the second network data in the first inspection report, where the abnormal second network data is second network data with an abnormal data status.

In a possible implementation of the second aspect, the first inspection report includes the health degree information of the first network device, and that the network management device obtains health degree information of the first network device includes the network management device determines the health degree information of the first network device based on the first inspection report.

In a possible implementation of the second aspect, that the network management device determines the health degree information of the entire network system based on the health degree information of the first network device and weight information corresponding to the first network device includes the network management device receives a second inspection report sent by a second network device, where the second inspection report includes corresponding second inspection result information of the second network device; the network management device obtains the health degree information of the first network device and health degree information of the second network device; and the network management device determines the health degree information of the entire network system based on the health degree information of the first network device, the health degree information of the second network device, the weight information corresponding to the first network device, and weight information corresponding to the second network device.

In a possible implementation of the second aspect, the first inspection result information further includes the health degree information of the first network device and/or fault snapshot information of the abnormal second network data, where the abnormal second network data is the second network data with the abnormal data status.

In a possible implementation of the second aspect, the first inspection policy information includes a first inspection policy identifier, the first inspection report includes a corresponding inspection policy identifier, and the method further includes, if the first inspection policy identifier is consistent with the corresponding inspection policy identifier included in the first inspection report, the network management device determines that inspection policy information corresponding to the first inspection report is the first inspection policy information.

A third aspect of embodiments of this application provides a network device. The network device includes a first obtaining module, configured to obtain target inspection policy information, where the target inspection policy information indicates the network device to collect inspection result information, the inspection result information includes first network data and second network data status information, the first network data is network data indicated by a target inspection policy information to be reported, the second network data status information indicates whether second network data is abnormal, and the second network data is network data indicated by the target inspection policy information to be inspected; a second obtaining module, configured to obtain the inspection result information in response to a case in which the network device meets an inspection trigger condition; and a sending module, configured to send an inspection report to a network management device, so that the network management device determines a network inspection result based on the inspection report, where the inspection report includes the inspection result information.

In a possible implementation of the third aspect, the first obtaining module is configured to receive the target inspection policy information sent by the network management device; or obtain the target inspection policy information from a built-in inspection policy information library.

In a possible implementation of the third aspect, that the network device meets the inspection trigger condition includes the network device determines that an event indicated by the target inspection policy information occurs; or the network device determines that a parameter indicated by the target inspection policy information meets a threshold condition; or the network device meets a time condition indicated by the target inspection policy information.

In a possible implementation of the third aspect, the network device further includes a conversion module, configured to convert the target inspection policy information into executable information of the network device; and correspondingly, the second obtaining module is configured to obtain the inspection result information by executing the executable information.

In a possible implementation of the third aspect, the executable information includes one or more of the following such as a script, a command, an internal object, or an interface.

In a possible implementation of the third aspect, the second obtaining module includes an obtaining unit, configured to obtain the first network data and the second network data; and a first determining unit, configured to determine the second network data status information based on the second network data.

In a possible implementation of the third aspect, the inspection result information further includes health degree information of the network device and/or fault snapshot information of abnormal second network data, where the abnormal second network data is second network data with an abnormal data status.

In a possible implementation of the third aspect, the second obtaining module further includes a second determining unit, configured to determine a quantity of entries of the abnormal second network data; and a third determining unit, configured to determine the health degree information of the network device based on the quantity of entries of the abnormal second network data, a quantity of entries of the second network data, and a weight of the abnormal second network data.

In a possible implementation of the third aspect, the inspection result information further includes an identifier of the target inspection policy information.

A fourth aspect of embodiments of this application provides a network management device. The network management device includes a first receiving module, configured to receive a first inspection report sent by a first network device, where the first inspection report includes first inspection result information collected by the corresponding first network device based on an indication of first inspection policy information, the first inspection policy information indicates the first network device to collect the first inspection result information, the first inspection result information includes first network data and second network data status information, the first network data is network data indicated by a target inspection policy information to be reported, the second network data status information indicates whether second network data is abnormal, and the second network data is network data indicated by the target inspection policy information to be inspected; and a first determining module, configured to determine a network inspection result based on the first inspection report.

In a possible implementation of the fourth aspect, the network management device further includes a generation module, configured to generate the first inspection policy information based on an inspection policy set by a user; and a sending module, configured to send the first inspection policy information to the first network device.

In a possible implementation of the fourth aspect, the sending module is configured to send the first inspection policy information to the first network device by using a network protocol, where the network protocol is one of a an FTP, an SFTP, a NETCONF, a RESTCONF, and a SNMP.

In a possible implementation of the fourth aspect, the first determining module is configured to determine the network inspection result based on the first inspection result information.

In a possible implementation of the fourth aspect, the network inspection result includes health degree information of an entire network system, and the first determining module includes an obtaining unit, configured to obtain health degree information of the first network device; and a determining unit, configured to determine the health degree information of the entire network system based on the health degree information of the first network device and weight information corresponding to the first network device.

In a possible implementation of the fourth aspect, the obtaining unit is configured to determine health degree information of a corresponding network device based on a quantity of entries of abnormal second network data and a quantity of entries of the second network data in the first inspection report, where the abnormal second network data is second network data in an abnormal data status.

In a possible implementation of the fourth aspect, the first inspection report includes the health degree information of the first network device, and the obtaining unit is configured to determine the health degree information of the first network device based on the first inspection report.

In a possible implementation of the fourth aspect, the network management device further includes a second receiving module, configured to receive a second inspection report sent by a second network device, where the second inspection report includes corresponding second inspection result information of the second network device; and an obtaining module, configured to obtain the health degree information of the first network device and health degree information of the second network device. Correspondingly, the obtaining unit is configured to determine the health degree information of the entire network system based on the health degree information of the first network device, the health degree information of the second network device, the weight information corresponding to the first network device, and weight information corresponding to the second network device.

In a possible implementation of the fourth aspect, the first inspection result information further includes the health degree information of the first network device and/or fault snapshot information of the abnormal second network data, where the abnormal second network data is the second network data with the abnormal data status.

In a possible implementation of the fourth aspect, the first inspection policy information includes a first inspection policy identifier, the first inspection report includes a corresponding inspection policy identifier, and the network management device further includes a second determining module, configured to determine, by the network management device, that inspection policy information corresponding to the first inspection report is the first inspection policy information if the first inspection policy identifier is consistent with the corresponding inspection policy identifier included in the first inspection report.

A fifth aspect of this application provides a network device. The network device has a function of implementing the method according to any one of the first aspect or the possible implementations of the first aspect. The function may be implemented by hardware, or may be implemented by hardware executing corresponding software. The hardware or the software includes one or more modules corresponding to the foregoing functions, for example, an obtaining module.

A sixth aspect of this application provides a network management device. The network management device has a function of implementing the method according to any one of the second aspect or the possible implementations of the second aspect. The function may be implemented by hardware, or may be implemented by hardware executing corresponding software. The hardware or the software includes one or more modules corresponding to the foregoing functions, for example, a sending module.

A seventh aspect of this application provides a network device. The network device includes at least one processor, a memory, an input/output (I/O) interface, and computer-executable instructions that are stored in the memory and that can be run on the processor. When the computer-executable instructions are executed by the processor, the processor performs the method according to any one of the first aspect or the possible implementations of the first aspect.

An eighth aspect of this application provides a network management device. The network management device includes at least one processor, a memory, an input/output (I/O) interface, and computer-executable instructions that are stored in the memory and that can be run on the processor. When the computer-executable instructions are executed by the processor, the processor performs the method according to any one of the second aspect or the possible implementations of the second aspect.

A ninth aspect of this application provides a computer-readable storage medium storing one or more computer-executable instructions. When the computer-executable instructions are executed by a processor, the processor performs the method according to any one of the first aspect or the possible implementations of the first aspect.

A tenth aspect of this application provides a computer-readable storage medium storing one or more computer-executable instructions. When the computer-executable instructions are executed by a processor, the processor performs the method according to any one of the second aspect or the possible implementations of the second aspect.

An eleventh aspect of this application provides a computer program product storing one or more computer-executable instructions. When the computer-executable instructions are executed by a processor, the processor performs the method according to any one of the first aspect or the possible implementations of the first aspect.

A twelfth aspect of this application provides a computer program product storing one or more computer-executable instructions. When the computer-executable instructions are executed by a processor, the processor performs the method according to any one of the second aspect or the possible implementations of the second aspect.

A thirteenth aspect of this application provides a chip system. The chip system includes at least one processor, and the at least one processor is configured to implement the related functions in any one of the first aspect or the possible implementations of the first aspect. In a possible design, the chip system may further include a memory, and the memory is configured to store program instructions and data that are necessary for an apparatus for processing an artificial intelligence model. The chip system may include a chip, or may include a chip and another discrete component.

A fourteenth aspect of this application provides a chip system. The chip system includes at least one processor, and the at least one processor is configured to implement the related functions in any one of the second aspect or the possible implementations of the second aspect. In a possible design, the chip system may further include a memory, and the memory is configured to store program instructions and data that are necessary for an artificial intelligence model-based data processing apparatus. The chip system may include a chip, or may include a chip and another discrete component.

A fifteenth aspect of this application provides a communication apparatus, used as a network device. The communication apparatus includes a memory, including instructions; and a processor, where when the processor executes the instructions, the communication apparatus is enabled to implement the method according to any one of the first aspect or the possible implementations of the first aspect.

A sixteenth aspect of this application provides a communication apparatus, used as a network device. The communication apparatus includes a memory, including instructions; and a processor, where when the processor executes the instructions, the communication apparatus is enabled to implement the method according to any one of the second aspect or the possible implementations of the second aspect.

A seventeenth aspect of this application provides a network inspection system. The network inspection system includes a network device and a network management device, the network device implements the method according to any one of the first aspect or the possible implementations of the first aspect, and the network management device implements the method according to any one of the second aspect or the possible implementations of the second aspect.

An eighteenth aspect of this application provides a computer program product, including a computer program. When the computer program is executed by a processor, the method according to any one of the first aspect or the possible implementations of the first aspect and the method according to any one of the second aspect or the possible implementations of the second aspect are implemented.

According to the foregoing technical solutions, it can be learned that embodiments of this application have the following advantages.

In embodiments of this application, the network management device and the network device no longer exchange the raw data of the network device, but the status data of the network device obtained through analysis and processing. This reduces an amount of collected data, and improves a speed and efficiency of network inspection. In addition, the network management device delivers the inspection policy information to the network device, and the network device may perform inspection by itself. This improves the inspection efficiency. Moreover, data reported by the network management device by using the inspection report may be the related data with the abnormal status, and the collected network data is highly effective.

DESCRIPTION OF EMBODIMENTS

Embodiments of this application provide a network inspection method, a network device, and a network management device, to improve efficiency of performing inspection on the network device by the network management device, reduce an amount of collected data, and improve validity of collected network data.

The following describes embodiments of this application with reference to the accompanying drawings. It is clear that the described embodiments are merely some but not all of embodiments of this application. A person of ordinary skill in the art may learn that, with development of technologies and emergence of new scenarios, technical solutions provided in embodiments of this application are also applicable to a similar technical problem.

In the specification, claims, and accompanying drawings of this application, the terms "first", "second", and the like are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

Figure 1:
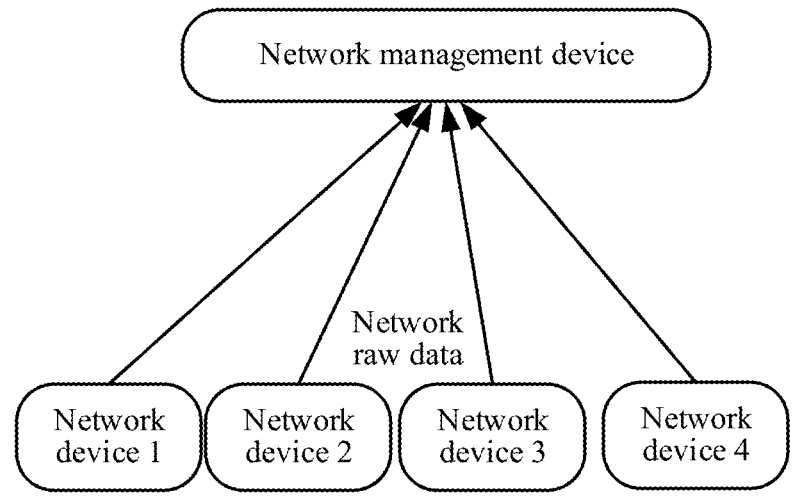
FIG. 1 is a schematic diagram of a scenario of a network system.

As shown in FIG. 1, to monitor a health degree status of a network system, detect a fault in the network system in a timely manner, and sense a status change of a network device in the network system in real time, a network management device needs to perform real-time monitoring and routine inspection on the network device, to ensure that the network system can run securely, stably, and reliably for long time. In this solution for obtaining the status of the network device, a user usually remotely logs in to the network device and inputs a command line to the network device, where the command line indicates the network device to collect specified network raw data, for example, network raw data such as device logs and alarm information of the network device. After collecting the raw data of the network device, the network management device performs analysis to determine the health degree status of the network device.

Figure 2:
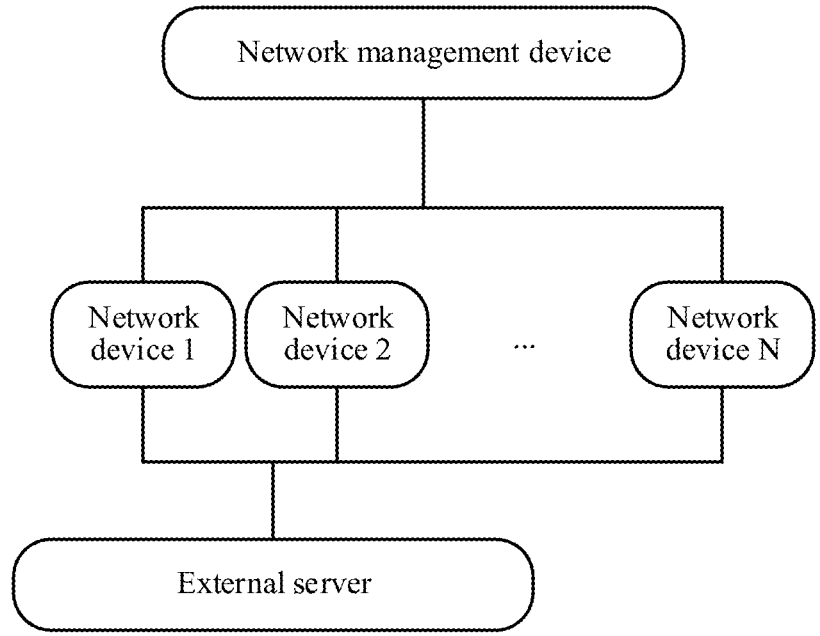
FIG. 2 is a diagram of a network architecture of a network inspection method according to an embodiment of this application.

As shown in FIG. 2, an embodiment of this application provides a network inspection method. The method is applied to a network system. The network system includes a network management device and a plurality of network devices. The network management device and any one of the plurality of network devices may transmit information to each other, and the plurality of network devices and an external server may further transmit data to each other. The network inspection method includes the network device obtains inspection policy information, where the inspection policy information indicates the network device to collect inspection result information. The inspection result information includes first network data and second network data status information, where the first network data is network data indicated by an inspection policy information to be reported, the second network data status information indicates whether second network data is abnormal, and the second network data is network data indicated by the inspection policy information to be inspected. If the network device determines that an inspection trigger condition corresponding to the inspection policy information is met, the network device obtains the inspection result information. Then, the network device generates an inspection report based on the inspection result information, where the inspection report includes the inspection result information and an identifier of the inspection policy information. Then, the network device sends the generated inspection report to the network management device, so that the network management device determines health degree information of the network device based on the inspection report.

Based on the foregoing network system, the following describes a network terminal identification method in an embodiment of this application.

Figure 3:
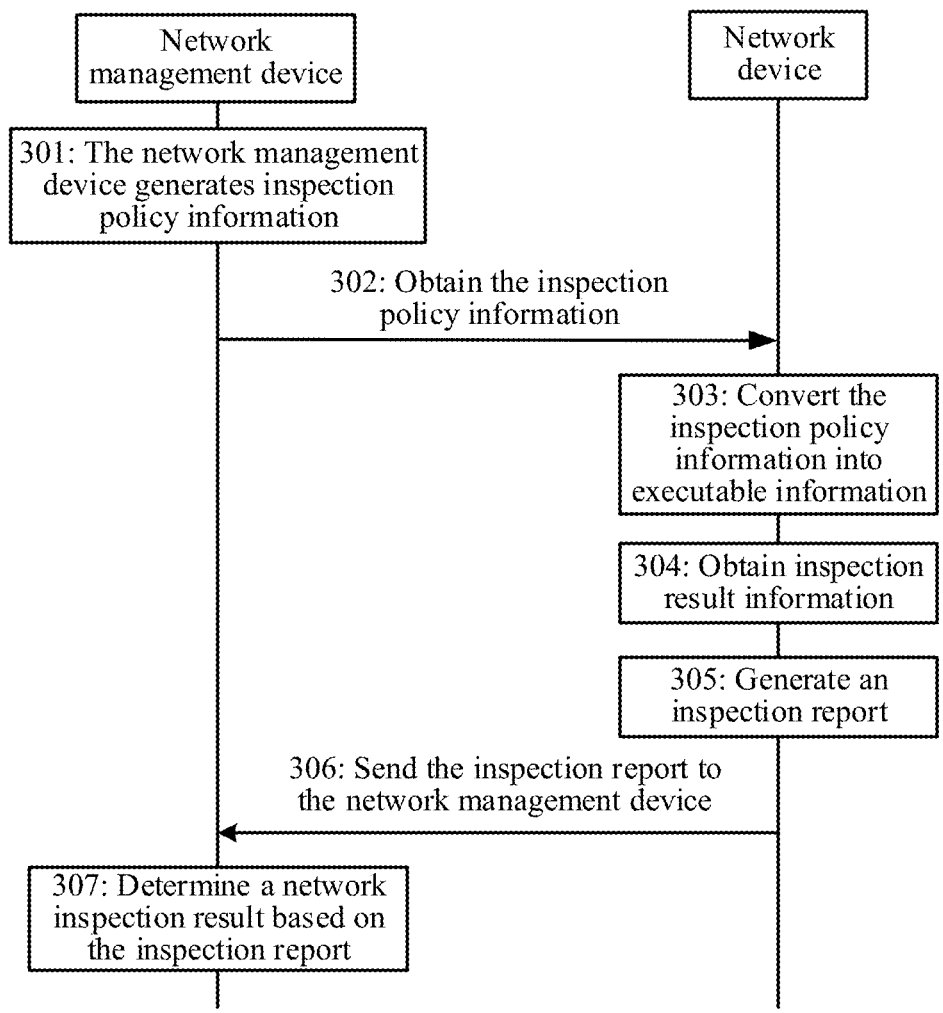
FIG. 3 is a schematic flowchart of a network inspection method according to an embodiment of this application.

FIG. 3 is a schematic flowchart of a network inspection method according to an embodiment of this application. As shown in FIG. 3, a procedure of the method includes the following several steps.

301: A network management device generates inspection policy information.

The network management device generates the inspection policy information based on policy content set by a user, where the inspection policy information includes a corresponding inspection policy identifier, and the inspection policy information indicates that a corresponding network device collects inspection result information indicated by the inspection policy information.

Figure 4:
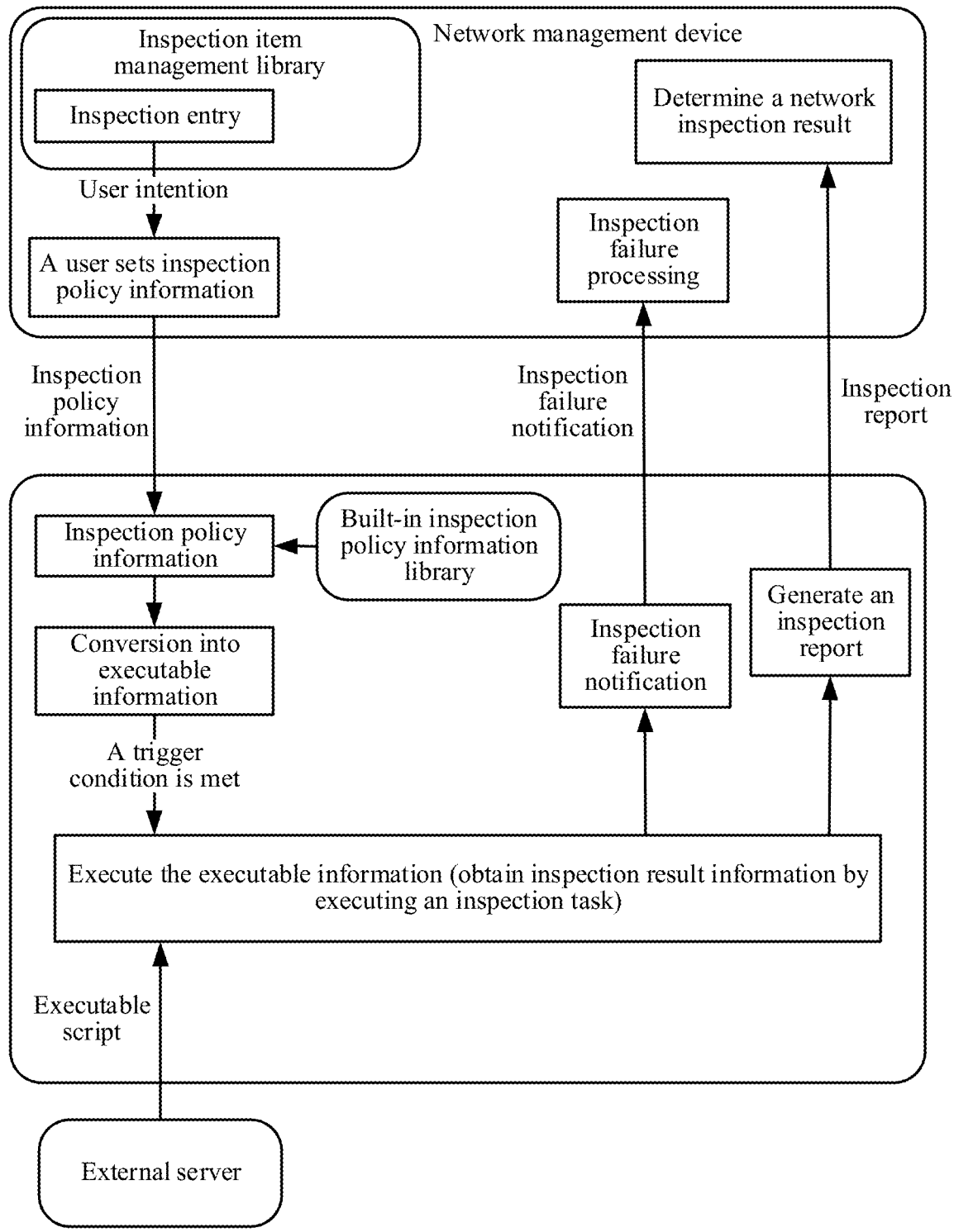
FIG. 4 is a signaling interaction diagram of a network inspection method according to an embodiment of this application.

In an example, as shown in FIG. 4, the network management device has a built-in inspection item management library, where the inspection item management library stores a plurality of inspection entries, each inspection entry corresponds to an inspection policy, and each inspection entry may indicate the network device to perform inspection on statuses of a plurality of pieces of second network data. Inspection policy content of a single item needs to be edited and verified in advance and then added to the inspection item management library. The network management device may generate the inspection policy information based on a setting of the user, to be specific, an inspection intention of the user.

Figure 5:
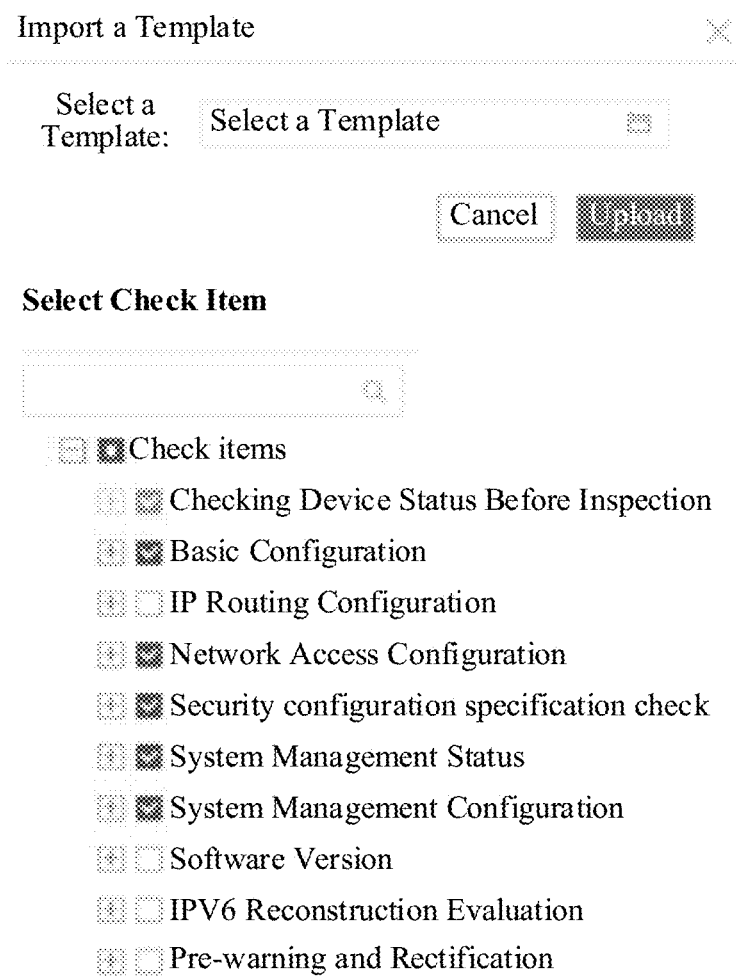
FIG. 5 is a schematic diagram of a scenario of generating inspection policy information according to an embodiment of this application.

As shown in FIG. 5, the user may select different inspection templates on the network management device, and any inspection template may include a plurality of inspection entries. For example, inspection items, namely, inspection entries, included in a first module in FIG. 5 include device status check before inspection, basic configuration check, IP routing check, network access check, security configuration specification check, system management status check, system management check, version, IPv6 reconstruction evaluation, and pre-warning and rectification. The user selects the basic configuration check, the network access check, the security configuration specification check, the system management status check, and the system management check in a template. The network management device generates the inspection policy information based on the selected inspection entries.

In this embodiment of this application, the user may set different inspection policy information based on different inspection intentions of the user. In addition, the user may further set corresponding inspection policy information based on information such as an importance degree, a type, and a network area layer of the network device, and the network management device may also preset different inspection templates based on information such as importance degrees, types, and network area layers of different network devices. For example, in this embodiment of this application, for inspection items with preset weight information, when setting inspection information, the user may modify the weight information of different inspection items. The user may modify and adjust the weight information of different inspection items in the inspection policy information based on the inspection intention of the user, to increase a weight of an inspection item with high importance, and reduce a weight of an inspection item with low importance. The user can also set weights of some inspection items to 0. In other words, inspection is performed only on these inspection items, and the inspection items are not calculated when a network inspection result such as health degree information is calculated. This is not limited herein.

For a plurality of network devices, the user may also generate different inspection policy information to indicate a sequence of executing inspection tasks by different network devices. For example, the user may set different inspection policy information for different network devices, where the inspection policy information specifies time for executing the inspection tasks. The user may set, by setting different time for executing the inspection tasks, the sequence of executing the inspection tasks by different network devices. For different inspection policy information of the same network device and different inspection entries of the same inspection policy information, the user may also set different inspection sequences.

In this embodiment of this application, the user may not only set different inspection policy information based on the inspection template and the inspection entry provided by the network management device, but also manage the inspection item management library. For example, the user may import an inspection template and an inspection entry from the outside, or compile a new inspection template and inspection entry on the network management device, or delete or modify the inspection template and the inspection entry in the inspection item management library. This is not limited herein.

In this embodiment of this application, the inspection policy information generated by the network management device may include the following information.

a. Inspection identifier: The inspection identifier may include an identifier of the inspection policy information and an identifier of an inspection item of the inspection policy information. The identifier may be an identifier such as an ID, a number, or a name. This is not limited herein.

b. Trigger mode of the inspection task corresponding to the inspection policy information: The trigger mode of the inspection task in this embodiment of this application may include the following types.

1. Event-based triggering: When an event indicated by the inspection policy information occurs on the network device, the network device is triggered to execute the inspection task. For example, that the network device is upgraded each time, that device logs of the network device show specified information, the network device alarm, or creation of an object obtained by the network device through an SNMP, a NETCONF, a RESTCONF, or a command-line view (CLI), and a status change of the obtained object, or another event may trigger the network device to execute the inspection task. This is not limited herein.

2. Threshold triggering: When a data indicator of the network device exceeds a threshold indicated by the inspection policy information, the network device is triggered to execute the inspection task. For example, when utilization of a central processing unit (CPU) of the network device is greater than 80%, the network device is triggered to execute the inspection task.

3. Periodic triggering: The network device is triggered to execute the inspection task at specific time or a specific periodicity based on a network device calendar, for example, at an interval of one hour or at fixed time of 02:00 every day. This is not limited herein.

4. One-time triggering: The network device is triggered to execute the inspection task at a specified time point based on the network device calendar. For example, the network device executes the corresponding inspection task at a time point specified by the inspection policy information, and for example, the network device executes the corresponding inspection task at 16:00 on May 5, 2022; or the network device immediately executes the corresponding inspection task when receiving the inspection policy information. This is not limited herein.

The trigger mode of the inspection task in this embodiment of this application includes but is not limited to the foregoing modes, and may be another mode, for example, a combination of the foregoing trigger modes, or an AND/OR/NOT logical operation of a single event or a plurality of events. For example, the network device may execute the corresponding inspection task when the utilization of the CPU of the network device is greater than 80% or after the network device is upgraded. This is not limited herein.

In this embodiment of this application, for some inspection policy information, the network device detects whether a trigger condition of the inspection policy information is met only after obtaining a corresponding enabling notification sent by the network management device. In other words, before obtaining the enabling notification, the network device does not detect whether the trigger condition of the inspection policy information is met, but only stores the inspection policy information.

c. Execution action of the inspection item

The execution action of the inspection item in this embodiment of this application may be a CLI command, an SNMP or an NETCONF, a RESTCONF action, a GNU Bourne-AgainShell (Bash) script, a Python script, a ruby script, a tool command language (TCL) script, an executable file, a single or a plurality of times of data analysis, a judging logic, or the like.

After the network management device orchestrates the inspection policy information based on the setting of the user, the network management device may generate a health degree scoring task table based on the inspection policy information, where the health degree scoring task table is used for determining health degree information of a corresponding network device based on the inspection result information.

In this embodiment of this application, the user may not need to manually deliver command lines for obtaining the network data of the network device one by one, but select, from the inspection items provided by the inspection item management library, an inspection item that meets the user intention, generate inspection policy information, and send the inspection policy information to the network device. This improves network inspection efficiency and reduces time for delivering a network inspection task.

302: The network device obtains the inspection policy information.

The network management device sends the inspection policy information to the corresponding network device, where the inspection policy information indicates the network device to obtain the corresponding inspection result information. Correspondingly, the network device receives the inspection policy information sent by the network management device.

The network management device sends the inspection policy information to the network device by using a network protocol. The network protocol may be any one of the following protocols: an FTP, an SFTP, a NETCONF, a RESTCONF, and an SNMP.

In an example, the inspection policy information obtained by the network device may be implemented in a plurality of manners, for example, another next generation (YANG) model or a JavaScript object notation (Json) file. If the inspection policy information is modeled by using the YANG model, the inspection policy information may be delivered by using the network management protocol such as the NETCONF or the RESTCONF. For an inspection policy in another form, the inspection policy information may be delivered by using the file transfer protocol such as the FTP or the SFTP.

For the inspection policy information in a form of the YANG model or the Json file, the network device parses the inspection policy information and converts the inspection policy information into information that can be executed by the network device, in other words, a script, an internal object, and/or an interface that can be understood by an inspection execution module in the network device. The inspection policy information in a form of an executable script such as Python or TCL is stored and loaded in a specific space inside the network device.

For example, a piece of inspection policy information in the form of the Json file is as follows.

```
{
   "arpCheck":{                            /An inspection policy identifier is arpCheck /
      "define":{
         "xpath": "company-arp:arp/company-fwm-resource:forward-table-
resources/forward-table-resource" }          /A node object of a forwarding table indicates
resource usage of the forwarding table/
      "events":{
         "e1":{                              / Name of a trigger condition/
            "trigger": "cycle(1)"/A trigger mode is periodic triggering, which is
performed once every hour/
         }
      },
      "strategy": "e1",
      "tasks":{/Task/
         "mainTask":{//Main task
            "action": "netconfGet(S{xpath})", /A specific action to be performed by a
network device is obtaining a value of a node object of xpath by using a netconf protocol/
            "publish":{
               "arpUsedNum": "S{result.arp-used }" /Output a result arpUsedNum to
the network device/
            },
            "switch":{                      /Define a trigger condition for sending an inspection
failure notification to a network management device/
               "fail( )":"${arpUsedNum}>100000" /If the output result arpUsedNu is
greater than 100000, confirm that the inspection fails/
            }
         }
      }
   }
}
```

The inspection policy information in the form of the Json file indicates an inspection policy name arpCheck, an inspection item xpath of the inspection policy, the trigger condition e1, that the inspection task execution mode is obtaining the value of the node object of xpath by using the netconf protocol, the output result arpUsedNum, and that an inspection failure condition is defined to be that arpUsedNum is greater than 100000.

For example, a piece of inspection policy information is delivered by using the NETCONF protocol as follows.

```
<?xml version="1.0" encoding=*"UF-8"?>
<rpc xmlns="urn:ietf:params:xml:ns:netconf:base:1.0" message-id="1639647629472">
   <edit-config>
      <config>
         <inspection xmlns="urn:company:yang:company-inspection">
            <policy>
               <policy-name>arpCheck</policy-name>           /An inspection policy identifier is arpCheck/
                  <events>
                     <event>
                        <event-name>e1</event-name>          /Name of a trigger condition event e1/
                        <event-type>timer</event-type>          /A type of the trigger condition is a time
                                                           type/
                        <start-time>00:00<start-time>         / Start time is 00:00/
                        <duration>1hour</duration>           /Executed once an hour/
                        <repeat-option>everyday</repeat-option>     /Executed every day/
                     </event>
                  </events>
                  <strategy>
                     <expression>e1</expression>        /The trigger condition is e1/
                  </strategy>
                  <tasks>
                  <task>
                     <name>mainTask</name>            /Main task/
                     <action>
                        <function>netconfget</function>/Specific action to be performed by a network
device/Obtain an object by using a netconf protocol/
                        <para>company-arp:arp/company-fwm-resource:forward-table-
resource/forward-table-resource</para>           /To obtain a value of a node object whose object is
xpath/
                        <result>; arpUsedNum</result> /A result is arpUsedNum /
                     <action>
```

```
            <switches>
                <switch>
                    <case>fail</case>              /If an inspection task fails to be executed/
                    <condition-left>arpUsedNum</condition-left>
                    <condition-calc>gt</condition-calc>
                    <condition-right>100000</condition-right>   /If the output result
arpUsedNum is greater than 100000, the inspection fails/
                </switch>
            </switches>
        </task>
      </tasks>
    </Policy>
  </inspection>
 </config>
</edit-config>
</rpc>
```

Similar to the inspection policy information in the form of the Json file, the inspection policy information delivered by using the NETCONF protocol indicates an inspection policy name arpCheck, an inspection item xpath of the inspection policy, the trigger condition e1, that the inspection task execution mode is obtaining the value of the node object of xpath by using the netconf protocol, the output result arpUsedNum, and that an inspection failure condition is defined to be that arpUsedNum is greater than 100000.

In this embodiment of this application, for the inspection policy information that has been sent to the network device and inspection policy information in an inspection policy information library of the network device, the network management device may further send an inspection policy management notification to the network device to perform management operation on the inspection policy information. The management operation may include querying, modifying, deleting, enabling, and disabling the inspection policy information, and may further disable a periodically triggered inspection policy information. For example, for disabled inspection policy information sent by a network management device to the network device, the network device detects whether a trigger condition of the inspection policy information is met only after obtaining a corresponding enabling notification sent by the network management device. In addition, the network device may also perform management operation such as querying, modifying, deleting, enabling, and disabling on the inspection policy information. This is not limited herein.

In a possible implementation, as shown in FIG. 4, the network device has a built-in inspection policy information library, and some pieces of inspection policy information in the inspection policy information library are already enabled. In other words, the network device detects in real time whether trigger conditions corresponding to the some pieces of inspection policy information are met. When a trigger condition of a piece of inspection policy information is met, the network device may determine the inspection policy information based on the trigger condition. For example, the network device may determine an identifier of the corresponding inspection policy information based on the trigger condition, and then determine the corresponding inspection policy information in an inspection policy information library based on the identifier of the inspection policy information. Then the network device may obtain the inspection policy information from the built-in inspection policy information library, and execute an inspection task corresponding to the inspection policy information. In other words, step 301 may not be performed, and the network device may obtain the inspection policy information from the built-in inspection policy information library, where the inspection policy information is similar to the inspection policy information sent by the network management device.

In a possible implementation, the network device receives inspection policy obtaining information sent by the network management device. The inspection policy obtaining information does not include a specific inspection policy, but includes an inspection policy information identifier or a network address of the inspection policy information. After receiving the inspection policy obtaining information, the network device may obtain corresponding inspection policy information based on the inspection policy obtaining information. For example, the inspection policy obtaining information sent by the network management device includes the inspection policy information identifier, and the network device may obtain the corresponding inspection policy information from the inspection policy information library built in the network device based on the inspection policy information identifier. For example, the inspection policy obtaining information sent by the network management device includes a uniform resource locator (URL). The URL may include a network address, an identifier, and a processing mode of one or more inspection policy obtaining information. The network device may access an external server based on the network address indicated by the URL and obtain inspection policy information indicated by the URL.

303: The network device converts the inspection policy information into executable information.

The network device converts the obtained inspection policy information into the executable information of the network device, where the executable information includes a script, a command, an internal object, and/or an interface.

In this embodiment of this application, the inspection policy information obtained by the network device may include a corresponding execution action. For details, refer to the descriptions of the execution action of the inspection item in step 301. After obtaining the inspection policy information, the network device may directly perform the execution action included in the inspection policy information without performing conversion. That is, step 303 may not be performed. This is not limited herein.

For example, in step 302, the network management device sends the inspection policy information in the form of the Json file or the inspection policy information delivered by using the NETCONF protocol. The internal interface of the device converted by the network device is as follows.

```
"fileName": "arpcheck",        /Inspection policy identifier/
"eventName": "e1",             /Name of the trigger condition/
"xpath":"company-arp:arp/company-fwm-resource:forward-table-resources/forward-table-
resource",        /The node object of the forwarding table indicates the resource usage of the
forwarding table/
" kpiAlias": "xpath",
"trigger": "cycle",            / The trigger mode is periodic triggering/
"triggerPara":1;               / Once every hour/
"taskName": "mainTask",    /A name of an inspection task in mainTask /
"actionFunc": "netconf get"   /A task action is obtaining by using the netconf protocol/
"actionPara": "xpath",         /The obtained object is xpath /
"publish": "arpUsedNum",       /Output arpUsedNum /
"publishvalue": "result:arp-used" /An ouput value is/
"switchcase": "fail",          /If the inspection task fails/
"switchleft": "arpUsedNum
"switchcalc":">",
"switchright": "100000",/ When the output result arpUsedNu is greater than 100000, confirm
that the inspection fails, and the network device may send the inspection failure notification to the
network management device/
```

Based on the conversion of the network device, the network device may determine the inspection policy name arpCheck, the inspection item xpath of the inspection policy, the trigger condition e1, that the inspection task execution mode is obtaining the value of the xpath node object by using the netconf protocol, the output result arpUsedNum, and that the inspection failure condition is defined to be that arpUsedNum is greater than 100000.

In a possible implementation, when the network device fails to convert the inspection policy information, the network device sends a conversion failure notification to the network management device, where the inspection failure notification indicates that the network device fails to convert the inspection policy information, so that the network management device can perform a corresponding management operation. This avoids invalid waiting of the network management device.

304: The network device obtains the inspection result information.

If the network device meets the inspection trigger condition corresponding to the inspection policy information, in response to a case in which the network device meets the inspection trigger condition, the network device may obtain the inspection result information by executing the inspection task.

The trigger mode of the inspection task in this embodiment of this application may be event-based triggering, threshold triggering, periodic triggering, one-time triggering, or a combination of the foregoing trigger modes. For details, refer to the descriptions of the trigger mode of the inspection task in step 301. Details are not described herein again.

In this embodiment of this application, the network device obtains, based on the inspection policy information and by executing the inspection task, the indicated inspection result information, where the inspection result information includes a first network data and second network data status information. The first network data is network data indicated by the inspection policy information to be reported, to be specific, information that needs to be reported to the network management device by a network device customized by an inspection policy. A network management system may perform performance analysis and status analysis on the network device and an entire network based on the first network data. Second network data is network data indicated by the inspection policy information to be inspected. To be specific, the inspection policy information specifies the network device to check whether a status of the data is abnormal. The second network data status information indicates whether the second network data is abnormal. The second network data status information may be used by the network device to determine a result of the inspection item of the inspection policy information.

In an example, in this embodiment of this application, the network device executes the inspection task based on the inspection policy information, and collects the inspection result information. The network device executes the executable information converted by the network device, and collects the first network data that needs to be reported by the network device to the network management device. In addition, the network device collects the second network data or the status information of the second network data. For second network data without direct status information, the network device may determine whether a status of the second network data is abnormal, to determine the status information of the second network data.

In this embodiment of this application, a manner in which the network device executes the inspection task based on the inspection policy information includes the SNMP, the NETCONF, the CLI, a telemetry technology Telemetry, an intra-device interface, and the like.

In a possible implementation mode, when the executable information of the inspection task that is indicated by the inspection policy information includes a script of an external server, and a script name and the address of the server where the script is stored are specified, the network device may obtain the script from a remote FTP/SFTP server and execute the script, to obtain corresponding inspection result information. The executable information may further include an internal object, a command, and/or an interface of the external server, and the network device may also execute a corresponding inspection task to obtain the part of inspection result information.

In a possible implementation, when the second network data status information is abnormal, in other words, when the inspection item corresponding to the second network data status information is abnormal, the network device may collect and store the abnormal second network data, and the data includes related data of the second network data. In an example, when the network device determines that a check result of an inspection item is abnormal, the network device may collect and store fault snapshot information related to the inspection item, where the fault snapshot information includes second network data corresponding to the inspection item with the abnormal check result, and corresponding context information, related configuration, and status data.

In a possible implementation, the network device fails to obtain the inspection result information or obtaining the inspection result information times out. That is, the inspection task fails to be executed or times out. The network device sends an inspection failure notification to the network management device, where the inspection failure notification indicates that the network device fails to obtain the inspection result information or obtaining the inspection result information times out, that is, the inspection task fails to be executed or times out, so that the network management device can perform a corresponding management operation. This avoids the invalid waiting of the network management device.

305: The network device generates an inspection report.

The network device generates the inspection report based on the obtained inspection result information, where the inspection result report includes the inspection result information of the network device, to be specific, the obtained first network data and second network data status information.

In a possible implementation, the inspection report further includes health degree information of the network device. The health degree information is an indicator for measuring a normal degree of a working status of the network device. The health degree information is affected by a quantity of times and time of abnormal network data that occurs due to abnormal working of the network device, and an importance degree of the abnormal network data. Therefore, the normal working degree of the network device may be evaluated based on the health degree information of the network device. In a network, if there are a lower proportion of a quantity of abnormal inspection items to a quantity of all inspection items and a lower weight of the abnormal inspection items, it is indicated that there are a higher normal working degree of the network device and a higher health degree of the network device. The weight of each inspection item is determined by factors such as an importance degree of the inspection item and an amount of inspection data of the inspection items.

In this embodiment of this application, the network device determines the health degree of the network device based on a quantity of entries of the abnormal second network data, a quantity of entries of the second network data, and a weight of the abnormal second network data of the network device. In the network, if there are a lower proportion of the quantity of entries of the abnormal second network data to the quantity of entries of the second network data and a lower weight of the abnormal second network data, it is indicated that there are a higher normal working degree of the network device and a higher health degree of the network device. For example, if a network device has four inspection items such as a processor working status, whether network bandwidth is lower than a threshold, alarm information, and fault information, where weights of two inspection items such as the processor working status and the fault information are 2, weights of two inspection items such as whether the network bandwidth is lower than the threshold and the alarm information are 1, and abnormal inspection items are whether the network bandwidth is lower than the threshold and the fault information, a health degree of the network device is $(1*1+1*2)/4=0.75$.

In a possible implementation, the inspection report further includes the identifier of the inspection policy information of the network device and the identifier of each inspection item in the inspection policy information. The received identifier of the inspection policy information and the received identifier of each inspection item in the inspection policy information may be used to determine which inspection policy information and which inspection items are responded to by the inspection report.

In a possible implementation, the inspection report further includes the fault snapshot information related to the abnormal check item, and the fault snapshot information includes the context information, the related configuration, and the status data corresponding to the abnormal check item. To be specific, for the second network data status information with an abnormal status, the inspection report may include information such as the abnormal second network data and the context information, the related configuration, and the status information of the abnormal second network data.

In this embodiment of this application, the inspection report may include inspection result information of current inspection. In addition, the network device further stores historical inspection result information stored in previous inspection. For an abnormal problem or based on an object, the inspection report may further include historical inspection result information of the abnormal problem or the object. For example, for a problem of abnormal operating temperature of a processor, it is found that the operating temperature of the processor is abnormal in the current inspection, and the inspection report of the current inspection may not only include abnormal operating temperature status information of the processor and a specific operating temperature of the processor, but also include operating temperature status information of the processor and a historical operating temperature of the processor in previous historical inspection result information.

In this embodiment of this application, the inspection result information reported in the inspection report is not raw data of the second network data, but the status information of the second network data. This greatly reduces an amount of data that needs to be uploaded by the network device to the network management device, and may allocate some analysis and determining services of the second network data to the corresponding network device for execution, thereby reducing a task amount of the network management device, reducing a performance requirement for the network management device, and reducing costs of the network management device.

306: The network device sends the inspection report to the network management device.

The network device sends the generated inspection report to the network management device, where the inspection report includes the inspection result information, so that the network management device can determine a network inspection result based on the inspection report. Correspondingly, the network management device receives the inspection report sent by the network device.

In this embodiment of this application, after generating the inspection report, the network device may actively send the inspection report to the network management device immediately or at specified time when the network device does not receive an inspection report obtaining request of the network device. Alternatively, when receiving the inspection report obtaining request of the network device, the network device sends a corresponding inspection report to the network management device based on an indication of the inspection report obtaining request. For example, the inspection report obtaining request may carry an identifier of inspection policy information, and the network device may determine a corresponding inspection report based on the identifier of the inspection policy information, and send the inspection report to the network management device.

307: The network management device determines the network inspection result based on the inspection report.

The network management device determines the network inspection result based on the received inspection report, where the inspection report includes the inspection result information, and the network management information may determine a network inspection result of an entire network system based on the inspection result information.

In an example, the network management device may receive a plurality of corresponding network inspection reports sent by a plurality of network devices, where the plurality of network inspection reports include a plurality of pieces of inspection result information of the plurality of network devices, and the network management device may determine network inspection results of the plurality of network devices and the network inspection result of the entire network system based on the plurality of pieces of inspection result information.

In this embodiment of this application, the network inspection result may be health degree information. After the network management device receives the plurality of inspection reports of the plurality of network devices, if the inspection reports include health degree information of the network devices that send the inspection reports, the network devices obtain the health degree information of the corresponding network devices from the inspection reports, and then determine health degree information of the entire network device based on the health degree information of the plurality of network devices and a weight of each network device. The weight of the network device is affected by an importance degree of the network device in the network system. For example, a network system includes four network devices. A network management device obtains health degree information of corresponding network devices from inspection reports sent by the four network devices, and receives the health degree information of the four network devices. A health degree of a network device A is 0.6 and a weight is 2; a health degree of a network device B is 0.8 and a weight is 3; a health degree of a network device C is 0.7 and a weight is 1; and a health degree of a network device D is 0.9 and a weight is 2. Therefore, a health degree of the entire network system is $(0.6*2+0.8*3+0.7*1+0.9*2)/4=1.525$. In addition, the health degree information of the entire network system may also be determined based on another algorithm. For example, the health degree information of the entire network system may be further determined based on influencing factors of factors such as a service, a role, a type, and a network type layer of each network device in the network system. This is not limited herein.

In a possible implementation, the inspection reports sent by the plurality of network devices do not include the health degree information of the corresponding network devices, and the network management device may obtain, through calculation, the health degree information of each corresponding network device based on the inspection result information in the inspection reports. For example, if an inspection report of a network device contains four inspection items such as processor working status, whether network bandwidth is lower than a threshold, alarm information, and fault information, weights of two inspection items such as the processor working status and the fault information are 2, weights of two inspection items such as whether the network bandwidth is lower than the threshold and the alarm information are 1, and abnormal inspection items are whether the network bandwidth is lower than the threshold and the fault information, a health degree of the network device is $(1*1+1*2)/4=0.75$.

In this embodiment of this application, the network management device may determine the health degree information of the entire network device. In addition, the network management device may further determine another network inspection result of the entire network system, for example, network throughput, medium utilization, delay time, bandwidth information, latency information, packet loss information, jitter information, and system stability information of the entire network system, which may be determined based on the inspection report of the network device. This is not limited herein.

In a possible implementation, the inspection report further includes the identifier of the inspection policy information of the network device and the identifier of each inspection item in the inspection policy information. After receiving the identifier of the inspection policy information of the network device and the identifier of each inspection item in the inspection policy information, the network management device may determine, based on the identifier of the inspection policy information and the identifier of each inspection item in the inspection policy information, which inspection policy information and which inspection items are responded to by the inspection report.

In this embodiment of this application, the delivered network inspection information has the corresponding trigger condition. Therefore, the corresponding inspection task may be executed when required, to obtain network data with higher time validity. This improves time validity of the inspection result information of the network device obtained by the network management device, and improves accuracy of the network inspection result.

Figure 6:
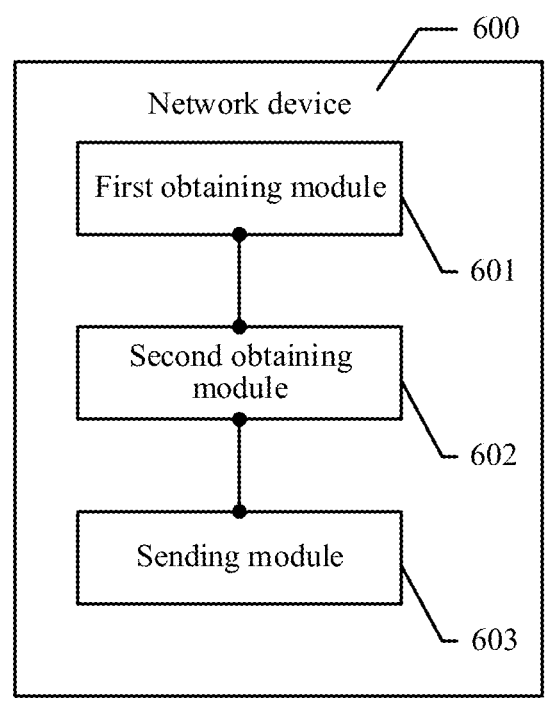
FIG. 6 is a schematic diagram of a structure of a network device according to an embodiment of this application.

The following describes a network device in an embodiment of this application. Referring to FIG. 6, an embodiment of this application provides a network device 600. The network device may be the network device in FIG. 3, and the network device 600 includes a first obtaining module 601, configured to obtain target inspection policy information, where the target inspection policy information indicates the network device to collect inspection result information, the inspection result information includes first network data and second network data status information, the first network data is network data indicated by a target inspection policy information to be reported, the second network data status information indicates whether second network data is abnormal, and the second network data is network data indicated by the target inspection policy information to be inspected, where for an example implementation, refer to step 302 in the embodiment shown in FIG. 3, where the network device obtains the inspection policy information, and details are not described herein again; a second obtaining module 602, configured to obtain the inspection result information in response to a case in which the network device meets an inspection trigger condition, where for an example implementation, refer to step 304 in the embodiment shown in FIG. 3, where the network device obtains the inspection result information, and details are not described herein again; and a sending module 603, configured to send an inspection report to a network management device, so that the network management device determines a network inspection result based on the inspection report, where the inspection report includes the inspection result information, where for an example implementation, refer to step 306 in the embodiment shown in FIG. 3, where the network device sends the inspection report to the network management device, and details are not described herein again.

In this embodiment, the network device may perform an operation performed by the network device in any embodiment shown in FIG. 3. Details are not described herein again.

Figure 7:
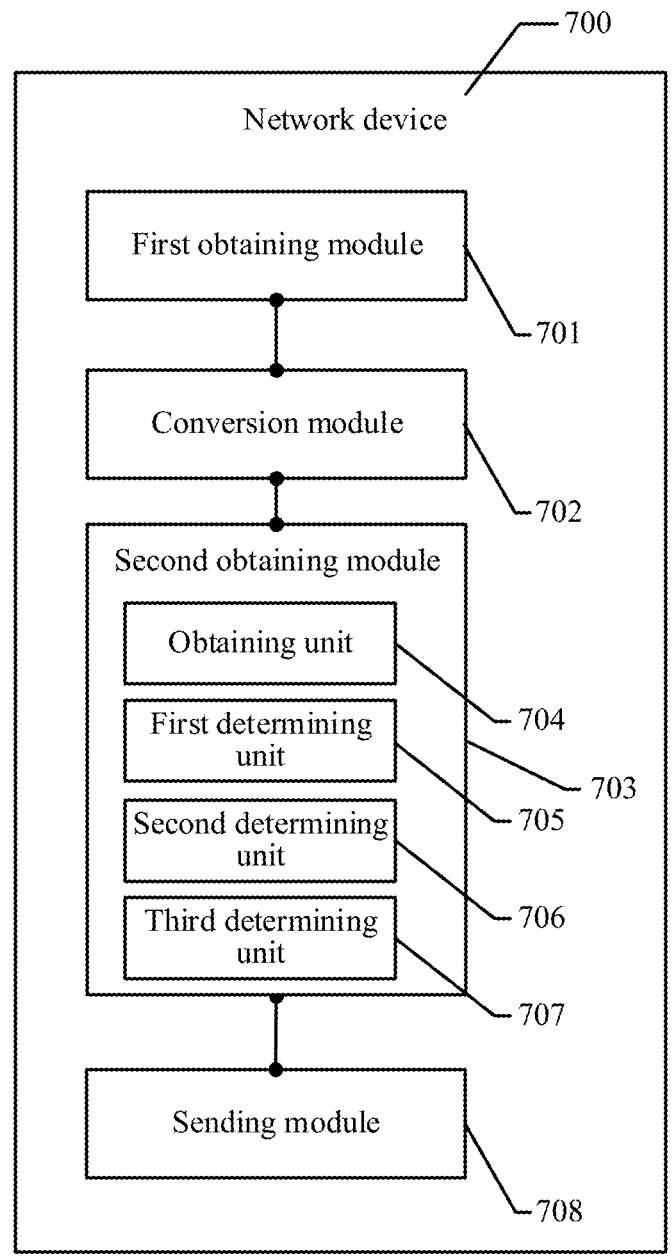
FIG. 7 is a schematic diagram of another structure of a network device according to an embodiment of this application.

The following describes a network device in an embodiment of this application. Referring to FIG. 7, an embodiment of this application provides a network device 700. The network device may be the network device in FIG. 3, and the network device 700 includes a first obtaining module 701, configured to obtain target inspection policy information, where the target inspection policy information indicates the network device to collect inspection result information, the inspection result information includes first network data and second network data status information, the first network data is network data indicated by a target inspection policy information to be reported, the second network data status information indicates whether second network data is abnormal, and the second network data is network data indicated by the target inspection policy information to be inspected, where for an example implementation, refer to step 302 in the embodiment shown in FIG. 3, where the network device obtains the inspection policy information, and details are not described herein again; and in a possible implementation, the first obtaining module 701 is configured to receive the target inspection policy information sent by a network management device; or obtain the target inspection policy information from a built-in inspection policy information library, where for an example implementation, refer to step 302 in the embodiment shown in FIG. 3, where the network device obtains the inspection policy information, and details are not described herein again; a conversion module 702, configured to convert the target inspection policy information into executable information of the network device, and the executable information may include one or more of the following such as a script, a command, an internal object, or an interface, where for an example implementation, refer to step 303 in the embodiment shown in FIG. 3, where the network device converts the inspection policy information into executable information, and details are not described herein again; a second obtaining module 703, configured to obtain the inspection result information in response to a case in which the network device meets an inspection trigger condition, where for an example implementation, refer to step 304 in the embodiment shown in FIG. 3, where the network device obtains the inspection result information, and details are not described herein again; in a possible implementation, the second obtaining module 703 is configured to obtain the inspection result information by executing the executable information, where for an example implementation, refer to step 304 in the embodiment shown in FIG. 3, where the network device obtains the inspection result information, and details are not described herein again; in a possible implementation, the second obtaining module 703 includes an obtaining unit 704, configured to obtain the first network data and the second network data, where for an example implementation, refer to step 304 in the embodiment shown in FIG. 3, where the network device obtains the inspection result information, and details are not described herein again; a first determining unit 705, configured to determine the second network data status information based on the second network data, where for an example implementation, refer to step 304 in the embodiment shown in FIG. 3, where the network device obtains the inspection result information, and details are not described herein again; a second determining unit 706, configured to determine a quantity of entries of abnormal second network data, where for an example implementation, refer to step 304 in the embodiment shown in FIG. 3, where the network device obtains the inspection result information, and details are not described herein again; a third determining unit 707, configured to determine health degree information of the network device based on the quantity of entries of the abnormal second network data, a quantity of entries of the second network data, and a weight of the abnormal second network data, where for an example implementation, refer to step 305 in the embodiment shown in FIG. 3, where the network device generates an inspection report, and details are not described herein again; and in a possible implementation, that the network device meets an inspection trigger condition includes that the network device determines that an event indicated by the target inspection policy information occurs; or the network device determines that a parameter indicated by the target inspection policy information meets a threshold condition; or the network device meets a time condition indicated by the target inspection policy information; and a sending module 708, configured to send the inspection report to the network management device, so that the network management device determines a network inspection result based on the inspection report, where the inspection report includes the inspection result information, where for an example implementation, refer to step 306 in the embodiment shown in FIG. 3, where the network device sends the inspection report to the network management device, and details are not described herein again; in a possible implementation, the inspection result information further includes the health degree information of the network device and/or fault snapshot information of the abnormal second network data, where the abnormal second network data is second network data with an abnormal data status; and in a possible implementation, the inspection result information further includes an identifier of the target inspection policy information.

In this embodiment, the network device may perform an operation performed by the network device in any embodiment shown in FIG. 3. Details are not described herein again.

Figure 8:
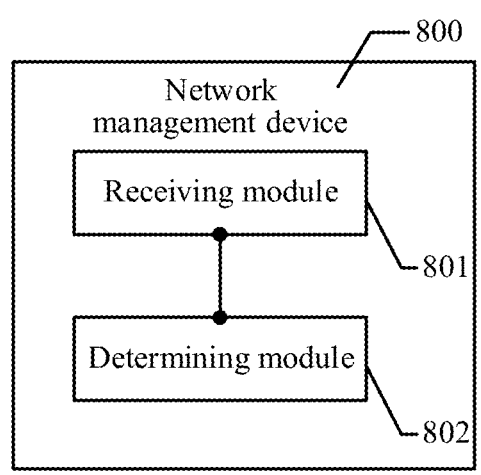
FIG. 8 is a schematic diagram of a structure of a network management device according to an embodiment of this application.

The following describes a network management device in an embodiment of this application. Referring to FIG. 8, an embodiment of this application provides a network management device 800. The network management device may be the network management device in FIG. 3. The network management device 800 includes a receiving module 801, configured to receive a first inspection report sent by a first network device, where the first inspection report includes first inspection result information collected by the corresponding first network device based on an indication of first inspection policy information, the first inspection policy information indicates the first network device to collect the first inspection result information, the first inspection result information includes first network data and second network data status information, the first network data is network data indicated by a target inspection policy information to be reported, the second network data status information indicates whether second network data is abnormal, and the second network data is network data indicated by the target inspection policy information to be inspected, where for an example implementation, refer to step 306 in the embodiment shown in FIG. 3, where the network device sends the inspection report to the network management device, and details are not described herein again; and a determining module 802, configured to determine a network inspection result based on the first inspection report, where for an example implementation, refer to step 307 in the embodiment shown in FIG. 3, where the network management device determines the network inspection result based on the inspection report, and details are not described herein again.

In this embodiment, the network management device may perform an operation performed by the network management device in any embodiment shown in FIG. 3. Details are not described herein again.

Figure 9:
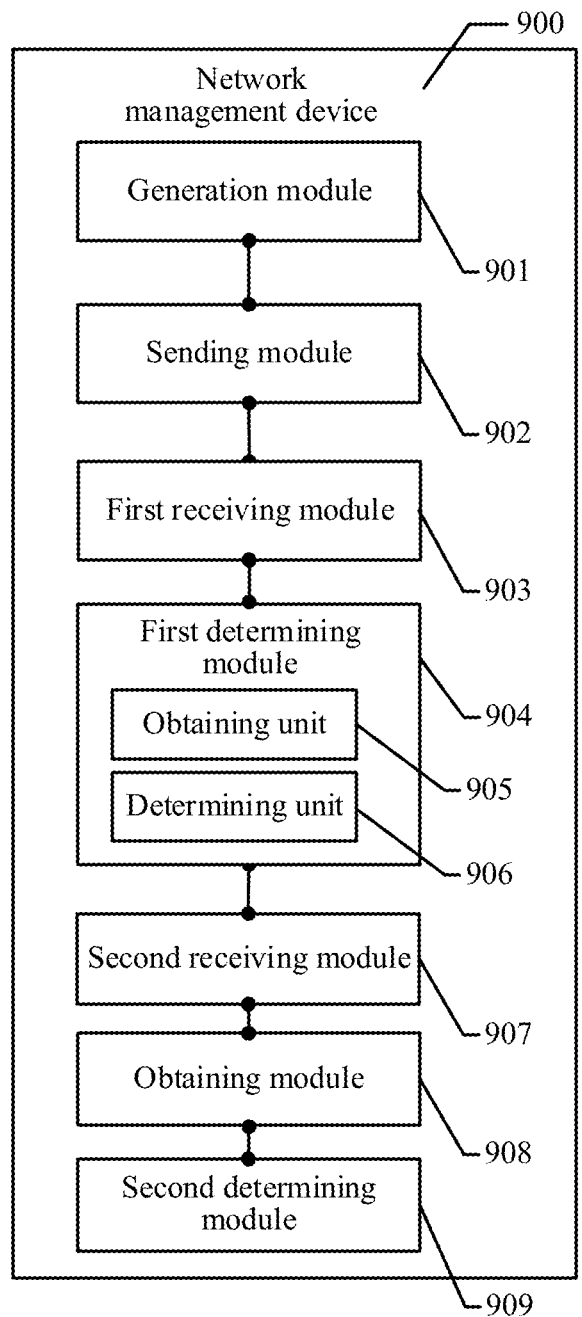
FIG. 9 is a schematic diagram of another structure of a network management device according to an embodiment of this application.

The following describes a network management device in an embodiment of this application. Referring to FIG. 9, an embodiment of this application provides a network management device 900. The network management device may be the network management device in FIG. 3. The network management device 900 includes a generation module 901, configured to generate first inspection policy information based on an inspection policy set by a user, where for an example implementation, refer to step 301 in the embodiment shown in FIG. 3 where the network management device generates inspection policy information, and details are not described herein again; a sending module 902, configured to send the first inspection policy information to a first network device, where for an example implementation, refer to step 302 in the embodiment shown in FIG. 3 where the network device obtains the inspection policy information, and details are not described herein again; and in a possible implementation, the sending module 902 is configured to send the first inspection policy information to the first network device by using a network protocol, where the network protocol is one of an FTP, an SFTP, a SNMP, a NETCONF, and a RESTCONF, where for an example implementation, refer to step 302 in the embodiment shown in FIG. 3 where the network device obtains the inspection policy information, and details are not described herein again; a first receiving module 903, configured to receive a first inspection report sent by a first network device, where the first inspection report includes first inspection result information collected by the corresponding first network device based on an indication of the first inspection policy information, the first inspection policy information indicates the first network device to collect the first inspection result information, the first inspection result information includes first network data and second network data status information, the first network data is network data indicated by a target inspection policy information to be reported, the second network data status information indicates whether a second network data is abnormal, and the second network data is network data indicated by the target inspection policy information to be inspected, where for an example implementation, refer to step 306 in the embodiment shown in FIG. 3 where the network device sends the inspection report to the network management device, and details are not described herein again; a first determining module 904, configured to determine a network inspection result based on the first inspection report, where for an example implementation, refer to step 307 in the embodiment shown in FIG. 3 where the network management device determines the network inspection result based on the inspection report, and details are not described herein again; the first determining module 904 is configured to determine the network inspection result based on the first inspection result information, where for an example implementation, refer to step 307 in the embodiment shown in FIG. 3 where the network management device determines the network inspection result based on the inspection report, and details are not described herein again; and in a possible implementation, the network inspection result includes health degree information of an entire network system, and the first determining module 904 includes an obtaining unit 905, configured to obtain health degree information of the first network device, where for an example implementation, refer to step 307 in the embodiment shown in FIG. 3 where the network management device determines the network inspection result based on the inspection report, and details are not described herein again; the obtaining unit 905 is configured to determine health degree information of a corresponding network device based on a quantity of entries of abnormal second network data and a quantity of entries of the second network data in the first inspection report, where the abnormal second network data is second network data with an abnormal data status, where for an example implementation, refer to step 307 in the embodiment shown in FIG. 3 where the network management device determines the network inspection result based on the inspection report, and details are not described herein again; and in a possible implementation, the first inspection report includes the health degree information of the first network device, and the obtaining unit 905 is configured to determine the health degree information of the first network device based on the first inspection report, where for an example implementation, refer to step 307 in the embodiment shown in FIG. 3 where the network management device determines the network inspection result based on the inspection report, and details are not described herein again; and a determining unit 906, configured to determine the health degree information of the entire network system based on the health degree information of the first network device and weight information corresponding to the first network device, where for an example implementation, refer to step 307 in the embodiment shown in FIG. 3 where the network management device determines the network inspection result based on the inspection report, and details are not described herein again; and the determining unit 906 is configured to determine the health degree information of the entire network system based on the health degree information of the first network device, health degree information of second network device, the weight information corresponding to the first network device, and weight information corresponding to the second network device, where for an example implementation, refer to step 307 in the embodiment shown in FIG. 3 where the network management device determines the network inspection result based on the inspection report, and details are not described herein again; a second receiving module 907, configured to receive a second inspection report sent by the second network device, where the second inspection report includes corresponding second inspection result information of the second network device, where for an example implementation, refer to step 307 in the embodiment shown in FIG. 3 where the network management device determines the network inspection result based on the inspection report, and details are not described herein again; an obtaining module 908, configured to obtain the health degree information of the first network device and the health degree information of the second network device, where for an example implementation, refer to step 307 in the embodiment shown in FIG. 3 where the network management device determines the network inspection result based on the inspection report, and details are not described herein again; in a possible implementation, the first inspection result information further includes the health degree information of the first network device and/or fault snapshot information of the abnormal second network data, where the abnormal second network data is the second network data with the abnormal data status; and in a possible implementation, the first inspection policy information includes a first inspection policy identifier, and the first inspection report includes a corresponding inspection policy identifier; and a second determining module 909, configured to determine, by the network management device, that inspection policy information corresponding to the first inspection report is the first inspection policy information if the first inspection policy identifier is consistent with the corresponding inspection policy identifier included in the first inspection report, where for an example implementation, refer to step 307 in the embodiment shown in FIG. 3 where the network management device determines the network inspection result based on the inspection report, and details are not described herein again.

In this embodiment, the network management device may perform an operation performed by the network management device in any embodiment shown in FIG. 3. Details are not described herein again.

Figure 10:
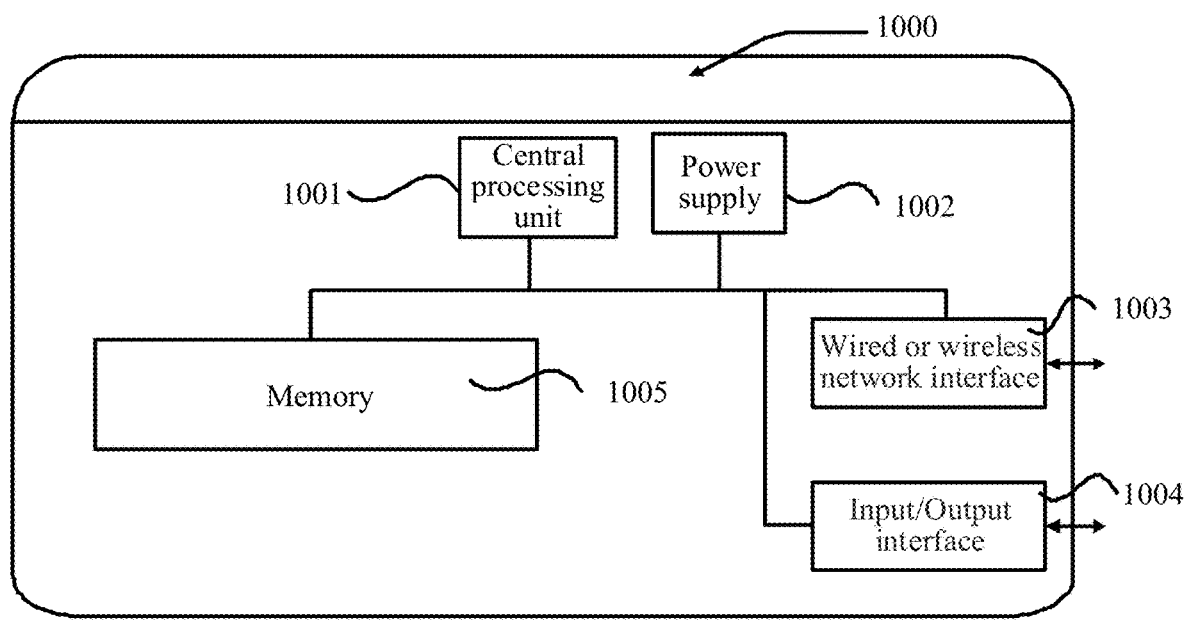
FIG. 10 is a schematic diagram of another structure of a network device according to an embodiment of this application.

FIG. 10 is a schematic diagram of a structure of a network device according to an embodiment of this application. The network device 1000 may include one or more CPU 1001 and a memory 1005. The memory 1005 stores one or more application programs or data.

The memory 1005 may be a volatile memory or a persistent memory. The program stored in the memory 1005 may include one or more modules, and each module may include a series of instruction operations for the network device. Further, the central processing unit 1001 may be configured to communicate with the memory 1005, and perform, on the network device 1000, the series of instruction operations in the memory 1005.

The central processing unit 1001 is configured to execute the computer program in the memory 1005, so that the network device 1000 is configured to perform the following where the network device obtains target inspection policy information, where the target inspection policy information indicates the network device to collect inspection result information, the inspection result information includes first network data and second network data status information, the first network data is network data indicated by a target inspection policy information to be reported, the second network data status information indicates whether second network data is abnormal, and the second network data is network data indicated by the target inspection policy information to be inspected; the network device obtains the inspection result information in response to that the network device meets an inspection trigger condition; and the network device sends an inspection report to a network management device, so that the network management device determines a network inspection result based on the inspection report, where the inspection report includes the inspection result information. For an example implementation, refer to step 301 to 307 in the embodiments shown in FIG. 3, and details are not described herein again.

The network device 1000 may further include one or more power supplies 1002, one or more wired or wireless network interfaces 1003, one or more input/output interfaces 1004, and/or one or more operating systems such as Windows Server™, Mac OS X™, Unix™, Linux™, and FreeBSD™.

The network device 1000 may perform an operation performed by the network device in the embodiment shown in FIG. 3. Details are not described herein again.

Figure 11:
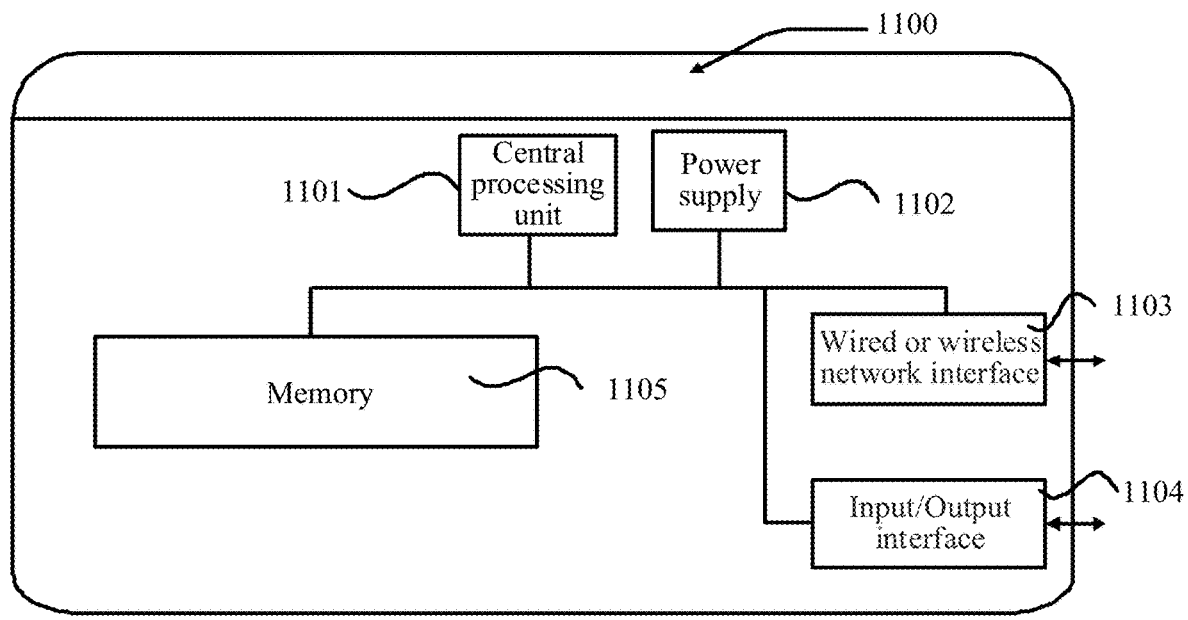
FIG. 11 is a schematic diagram of another structure of a network management device according to an embodiment of this application.

FIG. 11 is a schematic diagram of a structure of a network management device according to an embodiment of this application. The network management device 1100 may include one or more CPU 1101 and a memory 1105. The memory 1105 stores one or more application programs or data.

The memory 1105 may be a volatile memory or a persistent memory. The program stored in the memory 1105 may include one or more modules, and each module may include a series of instruction operations for the network management device. Further, the central processing unit 1101 may be configured to communicate with the memory 1105, and perform, on the network management device 1100, the series of instruction operations in the memory 1105.

The central processing unit 1101 is configured to execute the computer program in the memory 1105, so that the network management device 1100 is configured to perform the following where the network management device receives a first inspection report sent by a first network device, where the first inspection report includes first inspection result information collected by the corresponding first network device based on an indication of first inspection policy information, the first inspection policy information indicates the first network device to collect the first inspection result information, the first inspection result information includes first network data and second network data status information, the first network data is network data indicated by a target inspection policy information to be reported, the second network data status information indicates whether second network data is abnormal, and the second network data is network data indicated by the target inspection policy information to be inspected; and the network management device determines a network inspection result based on the first inspection report. For an example implementation, refer to step 301 to 307 in the embodiments shown in FIG. 3, and details are not described herein again.

The network management device 1100 may further include one or more power supplies 1102, one or more wired or wireless network interfaces 1103, one or more input/output interfaces 1104, and/or one or more operating systems such as Windows Server™, Mac OS X™, Unix™, Linux™, and FreeBSD™.

The network management device 1100 may perform an operation performed by the network management device in the embodiment shown in FIG. 3. Details are not described herein again.

Figure 12:
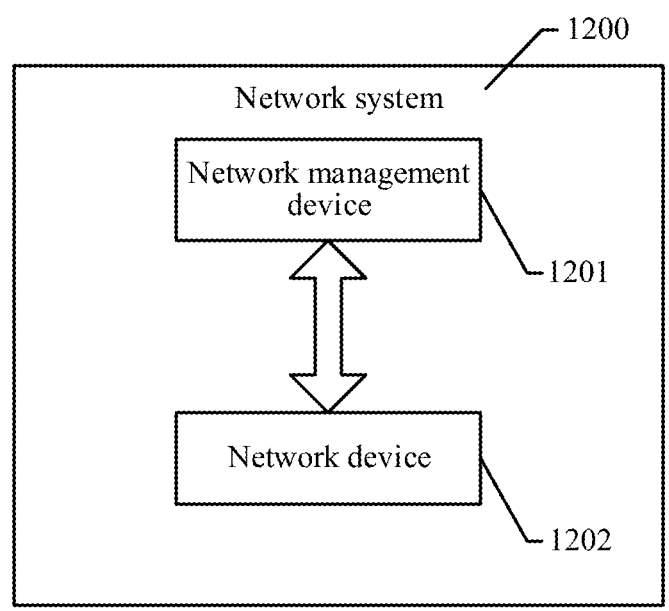
FIG. 12 is a schematic diagram of a structure of a network system according to an embodiment of this application.

FIG. 12 is a schematic diagram of a structure of a network system according to an embodiment of this application. The network system 1200 may include a network management device 1201 and a network device 1202. The network management device 1201 and the network device 1202 may implement the network inspection method shown in FIG. 3. For an example implementation, refer to step 301 to 307 in the embodiments shown in FIG. 3, and details are not described herein again.

It may be clearly understood by a person skilled in the art that, for convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to a current technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a Universal Serial Bus (USB) flash drive, a removable hard disk, a read-only memory (ROM), a random-access memory (RAM), a magnetic disk, or an optical disc.

What is claimed is:

1. A method, comprising:
    obtaining target inspection policy information, wherein the target inspection policy information are instructions to collect inspection result information, wherein the inspection result information comprises first network data, second network data status information, a quantity of entries of abnormal second network data, and at least a health degree information, wherein the abnormal second network data is second network data with an abnormal data status, wherein the health degree information is based on the quantity of entries of the abnormal second network data, a quantity of entries of the second network data, and a weight of the abnormal second network data, wherein the first network data indicates that a target inspection policy information is to be reported, wherein the second network data status information indicates whether second network data is abnormal, and wherein the second network data indicates that the target inspection policy information is to be inspected;
    obtaining the inspection result information based on meeting an inspection trigger condition; and
    sending an inspection report to a network management device for the network management device to obtain a network inspection result based on the inspection report, wherein the inspection report comprises the inspection result information.

2. The method of claim 1, wherein the obtaining, the target inspection policy information comprises:
    receiving the target inspection policy information from the network management device; or
    obtaining the target inspection policy information from a built-in inspection policy information library.

3. The method of claim 2, wherein meeting the inspection trigger condition comprises:
    an event indicated by the target inspection policy information occurs;
    a parameter indicated by the target inspection policy information meets a threshold condition; or
    a time condition indicated by the target inspection policy information is met.

4. The method of claim 3, wherein before obtaining the inspection result information, the method further comprises:
    converting the target inspection policy information into executable information; and
    obtaining the inspection result information: by executing the executable information.

5. The method of claim 4, wherein the executable information comprises one or more of a script, a command, an internal object, or an interface.

6. The method of claim 1, wherein the inspection result information comprises the first network data and the second network data, and wherein the second network data status information is based on the second network data.

7. The method of claim 1, wherein the inspection result information further comprises an identifier of the target inspection policy information.

8. An apparatus comprising:
    a memory configured to store instructions; and
    at least one processor coupled to the memory and configured to execute the instructions to cause the apparatus to:
        obtain target inspection policy information, wherein the target inspection policy information are instructions to collect inspection result information, wherein the inspection result information comprises first network data, second network data status information, a quantity of entries of abnormal second network data, and at least a health degree information, wherein the abnormal second network data is second network data with an abnormal data status, wherein the abnormal second network data is second network data with an abnormal data status, wherein the health degree information is based on the quantity of entries of the abnormal second network data, a quantity of entries of the second network data, and a weight of the abnormal second network data, wherein the first network data indicates that a target inspection policy information is to be reported, wherein the second network data status information indicates whether second network data is abnormal, and wherein the second network data indicates that the target inspection policy information is to be inspected;
        obtain the inspection result information based on meeting an inspection trigger condition; and
        send an inspection report to a network management device for the network management device to obtain a network inspection result based on the inspection report, wherein the inspection report comprises the inspection result information.

9. The apparatus of claim 8, wherein the at least one processor is further configured to execute the instructions to cause the apparatus to:
    receive the target inspection policy information from the network management device; or
    obtain the target inspection policy information from a built-in inspection policy information library.

10. The apparatus of claim 9, wherein meeting the inspection trigger condition comprises:

an event indicated by the target inspection policy information occurs;
a parameter indicated by the target inspection policy information meets a threshold condition; or
a time condition indicated by the target inspection policy information is met.

11. The apparatus of claim 10, wherein the at least one processor is further configured to further execute the instructions to cause the apparatus to:
convert the target inspection policy information into executable information; and
obtain the inspection result information by executing the executable information.

12. The apparatus of claim 11, wherein the executable information comprises one or more of a script, a command, an internal object, or an interface.

13. The apparatus of claim 8, wherein the at least one processor is further configured to execute the instructions to cause the apparatus to:
obtain the first network data and the second network data; and
determine the second network data status information based on the second network data.

14. The apparatus of claim 13, wherein the inspection result information further comprises an identifier of the target inspection policy information.

15. A computer program product comprising computer-executable instructions that are stored on a non-transitory computer-readable storage medium and that, when executed by at least one processor, cause an apparatus to:
obtain target inspection policy information, wherein the target inspection policy information are instructions to collect inspection result information, wherein the inspection result information comprises first network data, second network data status information, a quantity of entries of abnormal second network data, and at least a health degree information, wherein the abnormal second network data is second network data with an abnormal data status, wherein the abnormal second network data is second network data with an abnormal data status, wherein the health degree information is based on the quantity of entries of the abnormal second network data, a quantity of entries of the second network data, and a weight of the abnormal second network data, wherein the first network data indicates that a target inspection policy information is to be reported, wherein the second network data status information indicates whether second network data is abnormal, and wherein the second network data indicates that the target inspection policy information is to be inspected;
obtain the inspection result information based on meeting an inspection trigger condition; and
send an inspection report to a network management device for the network management device to obtain a network inspection result based on the inspection report, wherein the inspection report comprises the inspection result information.

16. The computer program product of claim 15, wherein the computer-executable instructions that when executed by the at least one processor further cause the apparatus to:
receive the target inspection policy information from the network management device; or
obtain the target inspection policy information from a built-in inspection policy information library.

17. The computer program product of claim 15, wherein meeting the inspection trigger condition comprises:
an event indicated by the target inspection policy information occurs;
a parameter indicated by the target inspection policy information meets a threshold condition; or
a time condition indicated by the target inspection policy information is met.

18. The computer program product of claim 15, wherein the computer-executable instructions that when executed by the at least one processor further cause the apparatus to:
convert the target inspection policy information into executable information; and
obtain the inspection result information by executing the executable information.

19. The computer program product of claim 18, wherein the executable information comprises one or more of a script, a command, an internal object, or an interface.

20. The computer program product of claim 15, wherein the computer-executable instructions that when executed by the at least one processor further cause the apparatus to:
obtain the first network data and the second network data; and
determine the second network data status information based on the second network data.

* * * * *